W. P. COLDREN.
CHAIN AND FLIGHT AND BUCKET CONNECTION.
APPLICATION FILED JUNE 20, 1914.
1,133,539.
Patented Mar. 30, 1915.
2 SHEETS—SHEET 2.
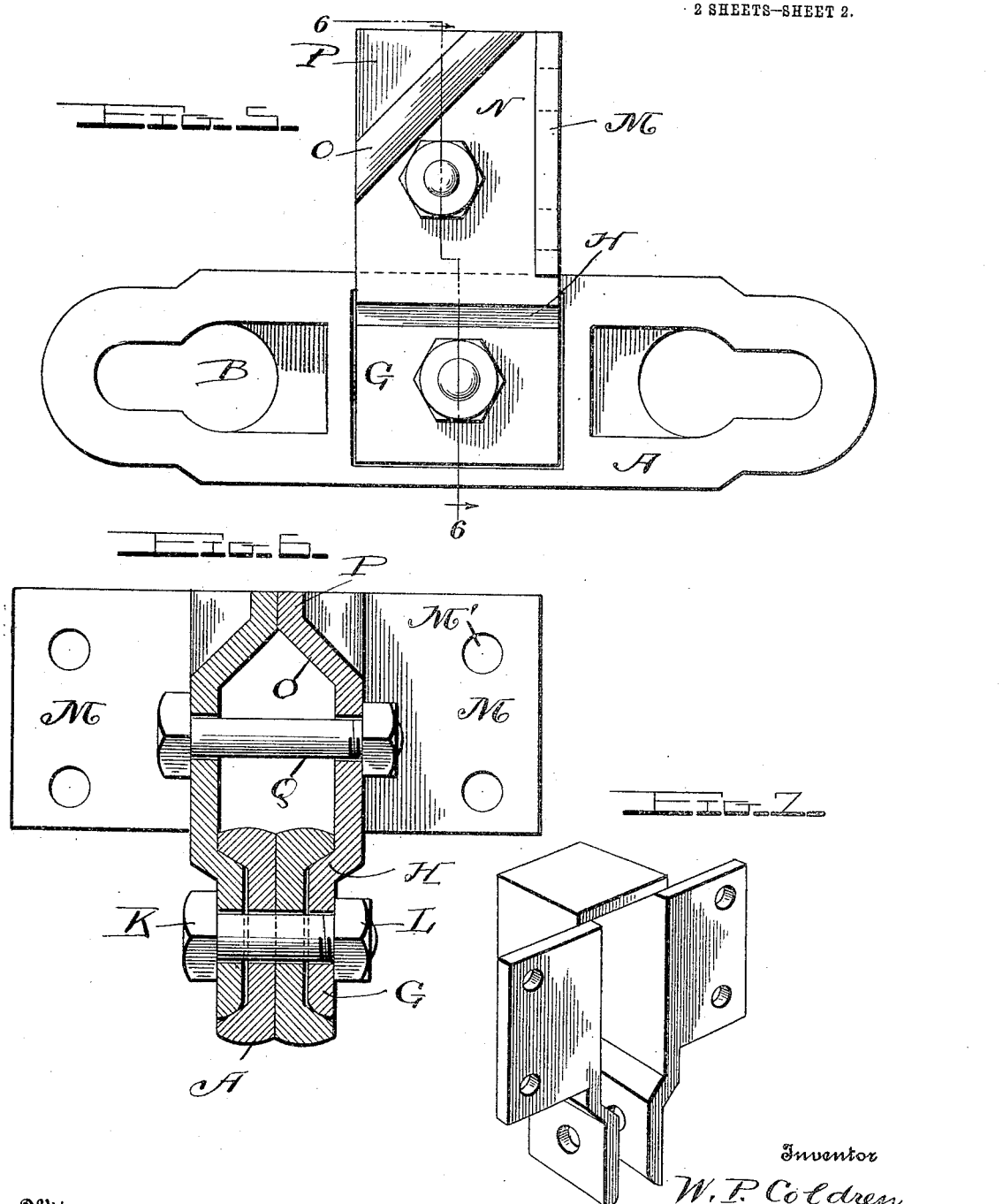

W. P. COLDREN.
CHAIN AND FLIGHT AND BUCKET CONNECTION.
APPLICATION FILED JUNE 20, 1914.
1,133,539.
Patented Mar. 30, 1915.
2 SHEETS—SHEET 1.
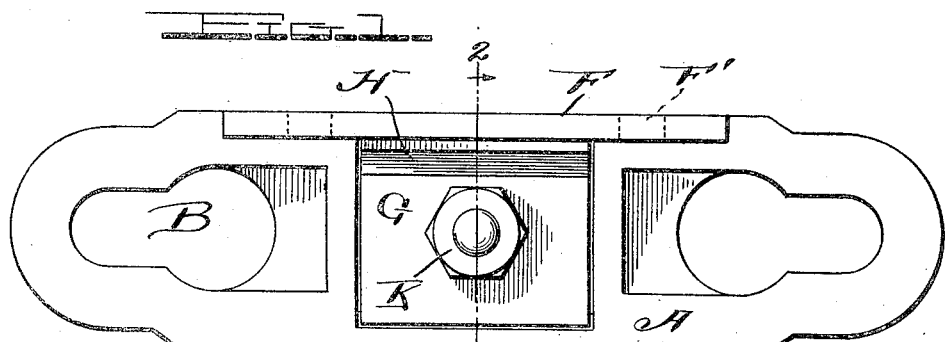
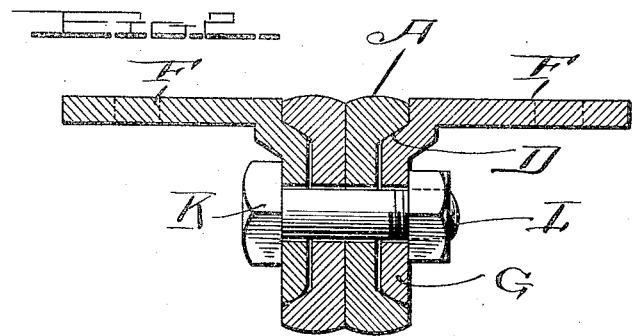
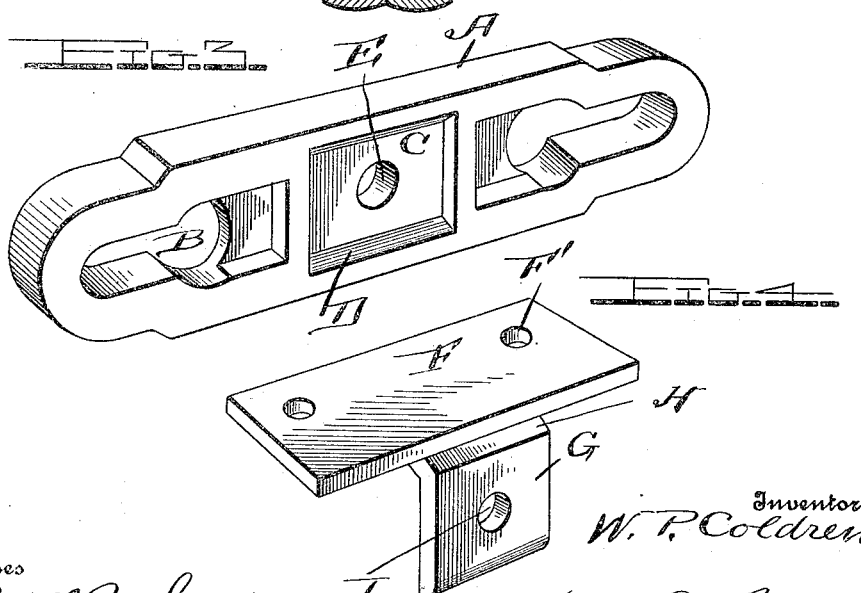
Witnesses
E. B. McBath
E. C. Hickey
Inventor
W. P. Coldren
By Chas. E. Brock
Attorney

UNITED STATES PATENT OFFICE.

WILLIAM P. COLDREN, OF LEBANON, PENNSYLVANIA.

CHAIN AND FLIGHT AND BUCKET CONNECTION.

1,133,539.  Specification of Letters Patent.  Patented Mar. 30, 1915.

Application filed June 20, 1914. Serial No. 846,279.

*To all whom it may concern:*

Be it known that I, WILLIAM P. COLDREN, a citizen of the United States, residing at Lebanon, in the county of Lebanon and State of Pennsylvania, have invented a new and useful Improvement in Chain and Flight and Bucket Connections, of which the following is a specification.

This invention relates generally to the construction of conveyer chains and more particularly to the novel construction of the link and the means for connecting flights and buckets to the links of said conveyer chain, my present invention also relating particularly to certain improvements shown, described, and claimed in my Patent No. 1,111,823 and 1,113,309.

The object of the present invention is to simplify and strengthen the flight and bucket connections and also the links to which they are connected.

With these objects in view my invention consists in the novel features of construction, and also to the combination and arrangements of parts, all of which will be fully described hereinafter and pointed out in the claims.

In the drawings forming a part of this specification Figure 1 is a side view of a chain link with bucket connector attached thereto. Fig. 2 is a sectional view on the line 2—2 of Fig. 1. Fig. 3 is a detail perspective view of my novel form of link. Fig. 4 is a detail perspective view of the bucket connector adapted to be attached to said link as shown in Figs. 1 and 2. Fig. 5 is a side view of a link with flight connector attached thereto. Fig. 6 is a sectional view on the line 6—6 of Fig. 5. Fig. 7 is another form of flight connector capable of use in connection with my novel construction of link.

In carrying out my invention I prefer to make the links and connecting parts by drop forging, and furthermore it will be understood that a chain constructed in accordance with my invention will be composed of links arranged in pairs, two links known as inside links being arranged face to face and contacting as most clearly shown in Figs. 2 and 6, these inside links being interposed between a pair of outside links (not shown), the inside links serving to space the outside links apart, each link having key hole shaped openings near its ends through which connecting pins can be passed for connecting the links together.

In the drawings A indicates the link and B the key hole shaped opening near the end thereof. Each link has a recess C formed in one face thereof intermediate its ends, this recess being inclosed or surrounded on all four sides and the top and bottom walls are preferably beveled or made slanting as shown at D. Each link is apertured as shown at E, this aperture being preferably in the center of the recess C. This link having the recess closed on all four sides is stronger than one having two sides only and furthermore the bucket and flight connections are more securely held in place.

The bucket connector employed in connection with my novel form of link is shown in Fig. 4, and comprises the flat or horizontal plate portion F and having bolt openings F' through which the bolts can be passed for attaching buckets to the connector. Connected with the plate F' is a vertical member G connected to the plate by means of an oblique or offset portion H, the slant thereof corresponding to the bevel of the wall D, and the opposite ends of the part G, are correspondingly beveled so that the member G can fit snugly within the recess C, the member G being of the exact size and shape as most clearly shown in Figs. 1 and 2. The member G has a bolt or opening I which registers with the opening E when the part G is inserted in the recess, and a bolt K is passed through two oppositely disposed bucket connectors and links to which they are connected, a nut L being screwed upon the opposite end for securely binding all of the parts together. It will be noted by reference to Fig. 2 that the plate portions F are flush with the tops of the links and that the offset portions H snugly fit into the beveled sides of the recesses, and that the member G fits into said recess so that all lost motion is completely avoided and the connecting bolt relieved of the greater portion of the strain which would otherwise be imposed thereon.

The bucket connectors are arranged in pairs as shown, and likewise the flight connectors as shown in Figs. 5 and 6. The flight connectors are each composed of the laterally extending wings M having bolt openings M' for the attachment of the flight, and integral with the wing M is a vertical portion N which at its lower end carries a member G, and oblique offset portion H the same as the bucket connector so that these portions can fit into the recessed portion of the link as most clearly shown in Figs. 5 and 6.

The vertical portion N has the upper free corner thereof upset obliquely as shown at O, that is it is pressed inwardly at an angle and also upon an incline as most clearly shown and the extreme corner is made upright or parallel with the main portion N, this extreme corner portion being indicated at P and by reference to Fig. 6 it will be seen that these corner portions contact with each other along a central line when the members G are positioned in the recesses of the links.

A bolt K and nut L are employed to fasten the flight connectors to the links and a bolt Q is passed through the vertical portions N for the purpose of preventing any buckling or bulging of these members when subjected to a strain. It will thus be seen that the members of the flight connector contact with each other along their upper edges and with the links at their lower ends and are trussed or braced intermediate their ends and thereby prevent any possibility of dislocation.

In Fig. 7 I have shown a one piece construction of flight connector which is also capable of use in connection with form of link herein illustrated, the ends being spread slightly to permit the pair of links to pass therebetween, and these ends are forced into the recesses and bolted.

It will thus be seen that I provide a novel construction of chain and flight and bucket connections which will carry out all of the objects hereinbefore referred to.

What I claim is:

1. In a device of the kind described, the combination with a pair of links, having oppositely disposed recesses the upper and lower edges thereof being beveled, connectors attached to said links said connectors having vertical portions adapted to fit into the link recesses, laterally extending portions, and oblique connecting portions adapted to engage the upper beveled edges of the link recesses and a bolt passing through said links and connectors.

2. In a device of the kind described, the combination with a pair of links, having centrally disposed recesses, the upper and lower edges thereof being beveled, a pair of connectors attached to said links, said connectors having oppositely disposed lateral wings, oblique offset portions and vertical portions adapted to fit the link recesses and bolts for connecting said parts together as shown and described.

WILLIAM P. COLDREN.

Witnesses:
 DAVID F. BUFFEMAYER,
 GEO. D. DULLABAHN.

"Copies of this patent may be obtained for five cents each, by addressing the "Commissioner of Patents, Washington, D. C.""